US010459676B2

United States Patent
Knoppert et al.

(10) Patent No.: US 10,459,676 B2
(45) Date of Patent: Oct. 29, 2019

(54) DYNAMIC USER INTERFACE FOR MULTIPLE SHARED DISPLAYS IN AN ELECTRONIC COLLABORATION SETTING

(71) Applicant: Dell Products, L.P., Round Rock, TX (US)

(72) Inventors: Michiel Sebastiaan Emanuel Petrus Knoppert, Amsterdam (NL); Deeder M. Aurongzeb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 61 days.

(21) Appl. No.: 15/294,732

(22) Filed: Oct. 16, 2016

(65) Prior Publication Data
US 2018/0107440 A1     Apr. 19, 2018

(51) Int. Cl.
| | |
|---|---|
| *G06F 3/14* | (2006.01) |
| *G06F 3/147* | (2006.01) |
| *G06F 3/0481* | (2013.01) |
| *G06F 3/01* | (2006.01) |
| *G01S 7/04* | (2006.01) |
| *G01S 13/42* | (2006.01) |
| *G06F 3/03* | (2006.01) |

(Continued)

(52) U.S. Cl.
CPC .............. *G06F 3/1423* (2013.01); *G01S 7/04* (2013.01); *G01S 13/42* (2013.01); *G06F 3/017* (2013.01); *G06F 3/0304* (2013.01); *G06F 3/0425* (2013.01); *G06F 3/0481* (2013.01); *G06F 3/147* (2013.01); *G09G 5/00* (2013.01); *G01S 13/06* (2013.01); *G06F 3/167* (2013.01); *G06F 2203/04803* (2013.01); *G06T 7/70* (2017.01); *G09G 2340/0464* (2013.01); *G09G 2354/00* (2013.01); *H04N 13/204* (2018.05)

(58) Field of Classification Search
None
See application file for complete search history.

(56) References Cited

U.S. PATENT DOCUMENTS

| | | | |
|---|---|---|---|
| 7,373,109 B2 * | 5/2008 | Pohja ................ | G06F 17/30038 340/539.1 |
| 7,583,252 B2 | 9/2009 | Kurtenbach et al. | |

(Continued)

OTHER PUBLICATIONS

Polyvision Corporation, ēno® interactive whiteboard user guide, 2012, pp. 1-75, available at http://techsupport.steelcase.com/Portals/0/support/userguide/2.4.0/eno_UG_2003173-001_RevB_EN.pdf.

*Primary Examiner* — Christopher J Fibbi
(74) *Attorney, Agent, or Firm* — Fogarty LLP

(57) ABSTRACT

Systems and methods for providing a dynamic user interface for multiple shared displays in an electronic collaboration setting. In some embodiments, an Information Handling System (IHS) may include one or more processors and a memory coupled to the one or more processors, the memory including program instructions stored thereon that, upon execution by the one or more processors, cause the IHS to: identify a first characteristic associated with a given one of a plurality of participants of an electronic collaboration session, at least in part, using an image sensing device; identify a second characteristic associated with the given participant, at least in part, using a proximity sensing device; and provide a user interface having a set or one or more features selected, at least in part, based upon the first and second characteristics.

16 Claims, 6 Drawing Sheets

(51) Int. Cl.
   *G06F 3/042*   (2006.01)
   *G09G 5/00*    (2006.01)
   G01S 13/06     (2006.01)
   G06T 7/70      (2017.01)
   G06F 3/16      (2006.01)
   H04N 13/204    (2018.01)

(56) References Cited

U.S. PATENT DOCUMENTS

| | | |
|---|---|---|
| 8,621,416 B1 | 12/2013 | Thomas |
| 8,884,876 B2 | 11/2014 | Song et al. |
| 8,928,604 B2 | 1/2015 | Wong et al. |
| 9,268,413 B2 | 2/2016 | Doray et al. |
| 2009/0106667 A1* | 4/2009 | Lyle .................... G06F 3/0488 715/750 |
| 2014/0245190 A1* | 8/2014 | Bragdon ............ G06Q 10/1095 715/753 |
| 2015/0149929 A1* | 5/2015 | Shepherd .............. H04L 65/403 715/753 |
| 2016/0179351 A1* | 6/2016 | Arnoldin ............ G06F 3/04845 715/759 |

\* cited by examiner

DYNAMIC USER INTERFACE FOR MULTIPLE SHARED DISPLAYS IN AN ELECTRONIC COLLABORATION SETTING

FIELD

The present disclosure generally relates to Information Handling Systems (IHSs), and, more particularly, to systems and methods for providing a dynamic user interface for multiple shared displays in an electronic collaboration setting.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include Random Access Memory (RAM), one or more processing resources such as a Central Processing Unit (CPU) or hardware or software control logic, ROM, and/or other types of nonvolatile memory. Additional components of the information handling system may include one or more disk drives, one or more network ports for communicating with external devices as well as various Input and Output (I/O) devices, such as a keyboard, a mouse, touchscreen and/or a video display. The IHS may also include one or more buses operable to transmit communications between the various hardware components. Further, the IHS may include telecommunication, network communication, and video communication capabilities.

SUMMARY

Embodiments of systems and methods for providing a dynamic user interface for multiple shared displays in an electronic collaboration setting are described. In an illustrative, non-limiting embodiment, a Information Handling System (IHS) may include one or more processors and a memory coupled to the one or more processors, the memory including program instructions stored thereon that, upon execution by the one or more processors, cause the IHS to: identify a first characteristic associated with a given one of a plurality of participants of an electronic collaboration session, at least in part, using an image sensing device; identify a second characteristic associated with the given participant, at least in part, using a proximity sensing device; and provide a user interface having a set or one or more features selected, at least in part, based upon the first and second characteristics.

In some implementations, the image sensing device includes a three-dimensional (3D) camera and the proximity sensing device includes a millimeter Radio Frequency (RF) wave sensor having an antenna array. The first characteristic may include at least one of: a position of the given participant in three-dimensional space, an identity of the participant, a size or reach of the participant, a role of the participant in the electronic collaboration session, a gesture made by the given participant, or an intent of the given participant. The second characteristic may include a position of the given participant relative to another participant.

The user interface may include at least one of: a Graphical User Interface (GUI), a speech recognition interface, or a gesture recognition interface. In some cases, set of one or more features may include a size or area of the GUI on a display device. Additionally or alternatively, the set of one or more features may include at least one of: an image, an icon, a menu, a file, a folder, a script, a software application, or an Operating System (OS). Additionally or alternatively, the set of one or more features may include an available voice or gesture command.

In some cases, the IHS may detect a change to at least one of the first or second characteristics during the electronic collaboration session and provide a user interface having another set of one or more features selected, at least in part, based upon the changed characteristic.

In response to the change indicating that the given participant's role in the electronic collaboration session has increased, the other set of features may be larger than the set of features, and \in response to the change indicating that the given participant's role in the electronic collaboration session has decreased, the other set of features may be smaller than the set of features. Additionally or alternatively, in response to the change indicating that the given participant has moved closer to a display, the other set of features may be larger than the set of features, and wherein in response to the change indicating that the given participant has move farther from the display, the other set of features may be smaller than the set of features.

In various embodiments, the electronic collaboration session may use a plurality of distinct screens visible to the plurality of participants. For example, a first one of the plurality of screens may be orthogonal with respect to a second one of the plurality of screens. The first screen may be part of a horizontal display device and the second display may be part of a vertical display device. The horizontal display device may be part of an electronic table. Moreover, the horizontal and vertical display devices may be disposed with a gap that allows the given participant to stand between the display devices.

In these embodiments, the IHS may determine that the given participant is standing in the gap, and it may split the user interface into a first portion and a second portion, where the first portion is displayed on the first display device with a first subset of one or more features, and where the second portion is displayed on the second display device with a second subset of one or more features. For instance, the first subset of features may include public information public with respect to the plurality of participants and the second subset of features may include private information with respect to the given participant.

In another illustrative, non-limiting embodiment, a method may implement one or more of the aforementioned operations. In yet another illustrative, non-limiting embodiment, a memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
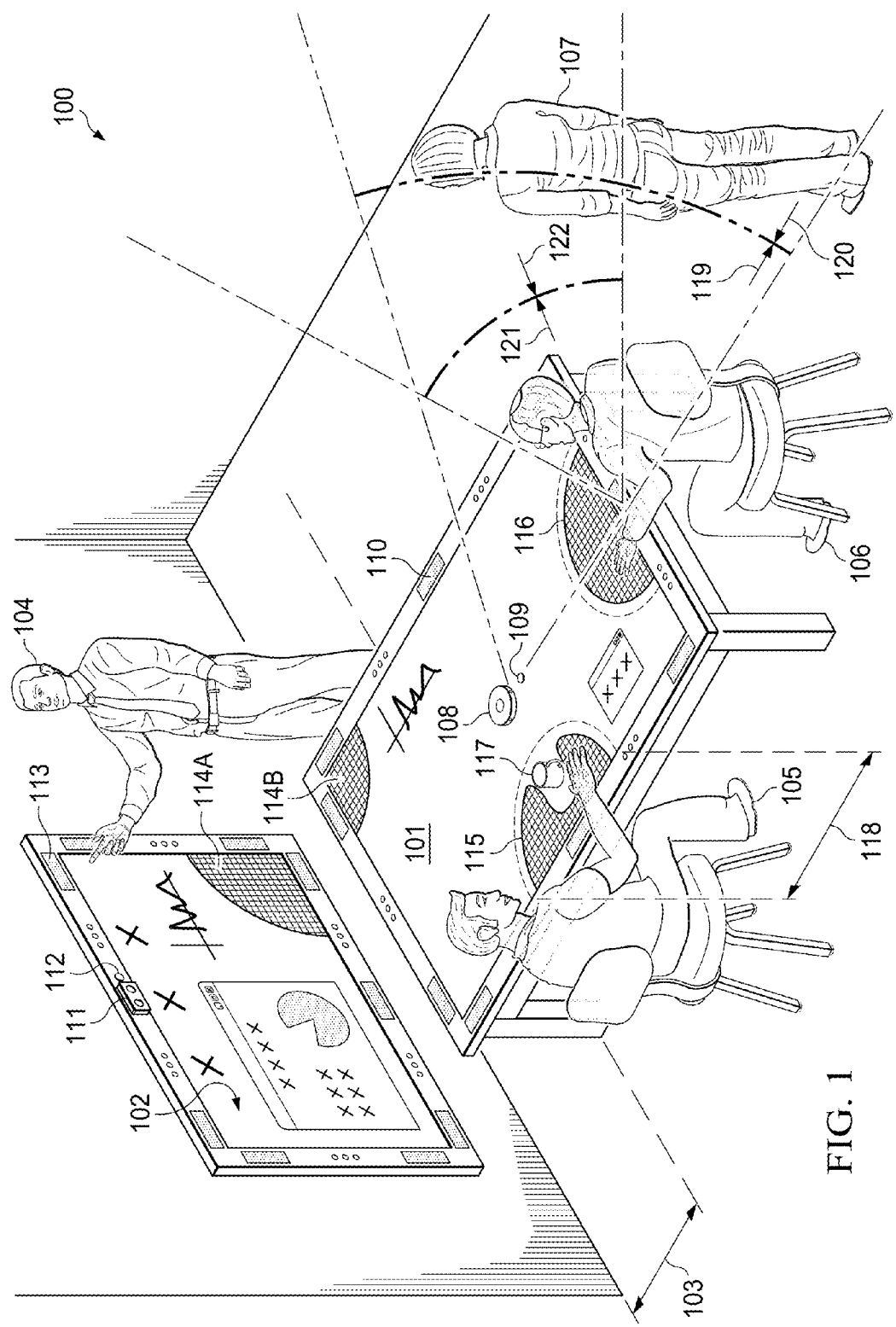
FIG. 1 is a diagram illustrating an example of an environment where systems and methods for providing a dynamic user interface for multiple shared displays in an electronic collaboration setting may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

Overview

The terms "electronic collaboration," "electronic meeting," "electronic collaboration session," "virtual collaboration session," and "virtual meeting," as used herein, generally refer to interactions where some degree or form of communication between participants makes use of an Information Handling System (IHS). Modern tools that facilitate "electronic collaboration" include, but are not limited to, video and data conferencing, instant messaging, electronic file sharing, and the like. In the case of video and data conferencing, for example, local and remote participants (in different geographic locations) may join a virtual meeting from their individual IHSs as if they were physically in the same room.

During an electronic collaboration session, a digital or virtual workspace may offer in-room and/or remote participants the ability to interact in real-time. In addition, one or more IHSs may provide, among other things, meeting setup, participant identification, proximity awareness, volumetric gesture and intent analysis, display control, etc., as well as information management, indexing and search, and/or meeting continuity. Moreover, a typical set of client capabilities working in concert across potentially disparate devices may include: access to a common shared workspace with public and private workspaces for file sharing and real-time collaboration, advanced digital whiteboarding with natural input to dynamically control access, robust search functionality to review past work, and/or the ability to seamlessly moderate content flow, authorization, and intelligent information retrieval.

In various embodiments, multiple displays may be shared and used at each location or room involved in an electronic collaboration session. These shared display devices may convey, among other things, an image of presenter showing graphical information to other participants, as well as the graphical information itself.

In some scenarios, at least two displays may be used in the same physical room: a first display (e.g., vertically mounted on a wall) and a second display (e.g., part of a horizontal smart desk or table), in an orthogonal configuration with respect to each other. Although certain techniques described herein are particularly well-suited for those scenarios, a person of ordinary skill in the art will recognize that these techniques may also be applied to other configurations.

When certain aspects of the framework described herein are applied to an IHS, for instance, the IHS may become a fixed point of reference providing an individualized user interface to one or more participants of the electronic meeting, potentially across multiple distinct displays. The IHS may maintain a relationship to a conference room and associated resources (e.g., peripheral hardware), for example. This allows the IHS to be a central hub for organizing meetings, and it does not rely on a host participant and their device to be present.

To illustrate but a few of the many features that may be implemented using systems and methods described herein, consider the following:

1. Multi-user interface and scaling. As the number of actions and reactions in a given electronic meeting grows, it quickly becomes difficult to follow and gain an understanding of its general flow. Accordingly, in some cases, sessions may be moderated by an IHS that records, analyzes, and determines a number of participants in the room, identities or one or more participants, identities which participants are active and which are not, and/or identities any participant's gestures and/or intent. Techniques described herein may provide a conversational user interface applicable to groups and communal environments, and may create injection points for the interface. For example, using exploration and comparative analysis of gesture patterns and voice (e.g., biometric feature extraction, analysis and selection), an IHS may be capable of determining "the most common and similar query pattern expressed among participants" or "how much variation is observed in a given gesture." In some cases, multi-camera-based pose estimation may be used. Pose states may be analyzed as a result of a pose training procedure during which a set of representative human poses and/or motion sequences are collected as classified. Each motion pose may be classified as belonging to a pose state, and motion data may be portioned into k segments with respect to a frame.

2. Communal interface policies. A policy may be implemented that is loosely interactive when two or more speakers are talking so that a graphical user interface follows one or more participants around the room. Gesture elicitation studies collect natural and common trends in human gestures by categorizing similar gestures into a set of groups based on perception, background knowledge, and interaction contexts. These studies may involve, for example, visualizing multiple motion data sequences to support exploration and understanding of gesture motion patterns, selecting interesting gesture patterns for detailed analysis, comparing gestures to identify similar and dissimilar gestures, supporting users to reflect their domain knowledge and interaction contexts into aggregating similar gesture data, and generating pattern analysis results in a form so that findings and insights can be shared with other researchers and domains. In some cases, systems and methods described herein may enable manipulation of content based participant's intent. For instance, if a participant leans over or talks, the IHS may move a GUI toward that participant or it may expand the GUI based on primary file content. A switch display camera may be used in asynchronous mode to track motion and position, which may be further augmented using audio, device cues (e.g., pen or pointer), communication signals (e.g., WiFi), and/or proximity detection (e.g., millimeter RF sensors).

3. Obstacle handling in a communal interface for interactive and non-interactive devices. Objects are be handled in a communal interface. For example, "virtual objects" are graphical elements drawn on a display, and include the target as well as a set of distracting objects that have a similar visual appearance as the target. Considerations taken into account when handling objects using the system and methods described herein may include, but are not limited to: space consumption (amount of space utilized by the technique in addition to the space utilized by the physical objects themselves), visual clutter (degree of visual clutter produced, for instance, with occluded objects no longer visible), spatial transformation (impact on the geometric properties of the visual space, including distortion, displacement, and rotation), and intention support (intentional occlusion when a participant wants to intentionally hide virtual objects using physical objects).

4. Volumetric tracing from 2D to 3D for orthogonal display and calibration. In some embodiments, interaction tracking may be enabled for orientation of GUI and information relative to two orthogonal displays, for example. Techniques described herein may scale proximity sensing with a 3D camera in state sharing or screen shot mode, create an orthogonal touch space using touch fusion, and create a volumetric space for gesture and switch between touch and gesture. Moreover, volumetric tracing may allow an IHS to distinguish between certain participants' spheres of activity (e.g., when one participant is behind or near another participant in the same room).

5. Multi-device content alignment using touch and voice. In some cases, a laptop (e.g., a primary device in a smart desk and wall computer might want to share file and yet need to work in unison for data scaling). In those cases, a 3D camera may be used for GUI zoning for a remote user camera and intended party. The IHS may follow the voice for file sharing, and/or it may adjust GUI based on size of the participant or the participant's reach.

6. Tagging data based on data state relation to a participant (multi-user aware). In some cases, an IHS may use voice and touch frequency to identify intent state and tag data or provision related data using a related data icon. It may use hand speed and frequency to identify a most interacting participant, for example. It may also use multiple gaze or blinking patterns to tag data of interest to a participant.

7. Audio-video synchronization system for orthogonal display systems. In some cases, an IHS may respond to dynamically changing audio and/or video misalignment targeted to a participant while remaining resilient to audio transforms. An IHS may take an independent measure for each audio channel for each display. Audio channels may be grouped (e.g., 5.1, Stereo, Described video, Secondary Language, etc.) that have different AV delays, audio codecs may be used with relative low quality but higher performance, watermarking may be used for audience ratings, and gain change and dynamic processing (compressor/limiter/AGC) may be used based on location of the participant, and physical fingerprint/audio/video content enable incoming share.

8. Off-screen styles as mouse. An IHS may enable a single "style," electronic pen, or pointer to be used locally to move object remotely or in another orthogonal display, thus reducing device diversity. A stylus may have an IR/optical sensor in the tip so it may detect movement. It may be used it like a normal stylus on a screen (e.g., the horizontal screen on a smart desk or table), and it may work as a mouse or pointing device with respect to an orthogonal screen (e.g., a vertical or wall display). The stylus can be moved across a horizontal desk surface for precise mouse movements and, when lifted up and pointed somewhere, it may accelerate the mouse movement. In some cases, pointing the device to a given display causes the stylus to be active with respect to that display, and inactive with respect to another.

9. Multi-Stylus synching with collaborative GUI for multi-user. In some cases, an IHS may identify a number of pens, number of participants using the pen and/or using pen and touch tiering. An overlapping GUI may be displayed to multiple users. Touch sensors, display firmware, and/or a pen controller may change the color and or line shape of digital pen to identify to other participants who is writing 10. Writing in VR/AR Space. In some cases, a stylus may be provided that includes an IR/optical sensor in the tip so it can detect movement. A critical interaction is taking real object and take notes in Augmented Reality (AR) or Virtual Reality (VR) spaces. The pen may e used, for example, with an AR glass and/or foldable OLED, and write in AR space. Feedback information to device and pen may be used with Internet-of-Things (IoT) technologies for information loading. Objects may be tracked and written to in AR space using a 3D camera and accelerometer, for example with simple tags (e.g., "ok" or "not ok").

11. Ambient light sensor and SAR fusion for display control. Scaling of brightness for two orthogonal displays is not natural for best GUI provision. In some cases, two or more ambient light sensors (ALS) and use proximity of the user (e.g., measuring specific absorption rate (SAR)) to scale brightness of the individual screen to uniform ambient. A dynamic brightness range may be used within the same display. For OLED display technologies, for example, this may be achieved by changing the blue intensity. For LCD display technologies, segmented LED from HDR technology may be used. In both cases, a brightness value may be scaled with the GUI and distance from the intended user using ALS, 3D, and SAR.

It should be noted that the aforementioned features are not exclusive and are provided for sake of illustration only, not necessarily in order of importance. It should also be noted that any embodiment described herein may provide any number of the aforementioned features, or none of them.

Other features will also be apparent to a person of ordinary skill in the art in light of this disclosure, several of which are described in more detail below.

In various embodiments, an IHS in the form of a smart display or smart table may include a number of sensors that provide information useful in managing each participant's gesture, voice, and/or graphical user interface(s) during an electronic meeting. Examples of sensors include: a 3D camera(s), proximity sensor(s) (e.g., a millimeter wave sensor having an antenna array, an ultrasonic sensor array, etc.), infrared (IR) sensor(s), Ambient Light Sensor(s) (ALS), etc.

In that regard, FIG. 1 is a diagram illustrating an example of environment 100 where systems and methods for providing a user interface for virtual meetings with multiple shared displays may be implemented, according to some embodiments. As shown, environment 100 may include, for example, a conference room, boardroom, meeting room, or the like, where participants 104-107 are present.

In this implementation, environment 100 includes two IHSs implemented in the form of a smart desk or table with horizontal display 101, and a vertical display 102. That is, displays 101 and 102 are orthogonal with respect to each other. Displays 101 and 102 may include a liquid crystal display (LCD), an organic light emitting diode (OLED), a flat panel display, a solid state display, or a cathode ray tube (CRT). Typically, gap 103 separates the two displays as shown, such that any in-room participant (e.g., participant 104) may walk between the two displays and at least partially block another participant's field of view and/or interface.

Smart desk 101 includes 3D camera 108, ALS 109, and proximity sensors 110. Similarly, display 102 includes 3D camera 111, ALS 112, and proximity sensors 113. In various implementations, cameras 108 and 111 may include stereo triangulation cameras, a sheet of light triangulation cameras, structured light cameras, time-of-flight cameras, interferometry cameras, coded aperture cameras, or any other type of 3D camera. Proximity sensors 110 and 113 may include millimeter RF sensors, and ALS sensors 109 and 112 may include any suitable photo or light detector or the like. It should be noted, however, that other sensors may be employed by either IHS.

Participant 104, which in this case may be identified as a speaker or presenter, is active and stands in a position such that his or her GUI is dynamically split across displays 102 and 101 in the form of areas 114A and 114B, respectively. Participant 105 is sitting at smart desk 101 and his or her GUI is shown as area 118, which changes dynamically as physical object 117 is placed in that surface, and which is restricted to having a maximum radius 118, determined by the participant's size or reach. Meanwhile, participant 106 has his or her GUI 116 also displayed on screen 101. It should be noted that, in addition to GUI portions 114-116, displays 101 and 102 may display content shared during the electronic collaboration session (e.g., documents, graphs, charts, videos, presentations, etc.).

In this example, participant 107 is standing behind or next to participant 106. Although participant 107 does not have a respective GUI on either display, it may nonetheless be capable of interacting in a virtual meeting by using gestures, audio commands, etc. In order to distinguish between each participants' different spheres of activity, sensor data from 3D camera 108 (or 111) may be used to determine a separation between participant 106 and participant 107 in areas 119 and 120, respectively. In addition, sensor data from proximity sensors 110 (or 113) may be used to find another (different) separation between participant 106 and participant 107 in areas 121 and 122, respectively.

As will be understood by a person of ordinary skill in the art in light of this disclosure, any business or non-business setting that requires meetings or collaboration may implement one or more aspects of the systems and methods described herein. Additionally, aspects of the framework described herein may be expanded to other areas, such as educational verticals for use in classrooms, or consumers for general meet-ups and/or reunions.

Virtual Collaboration Architecture

Figure 2:
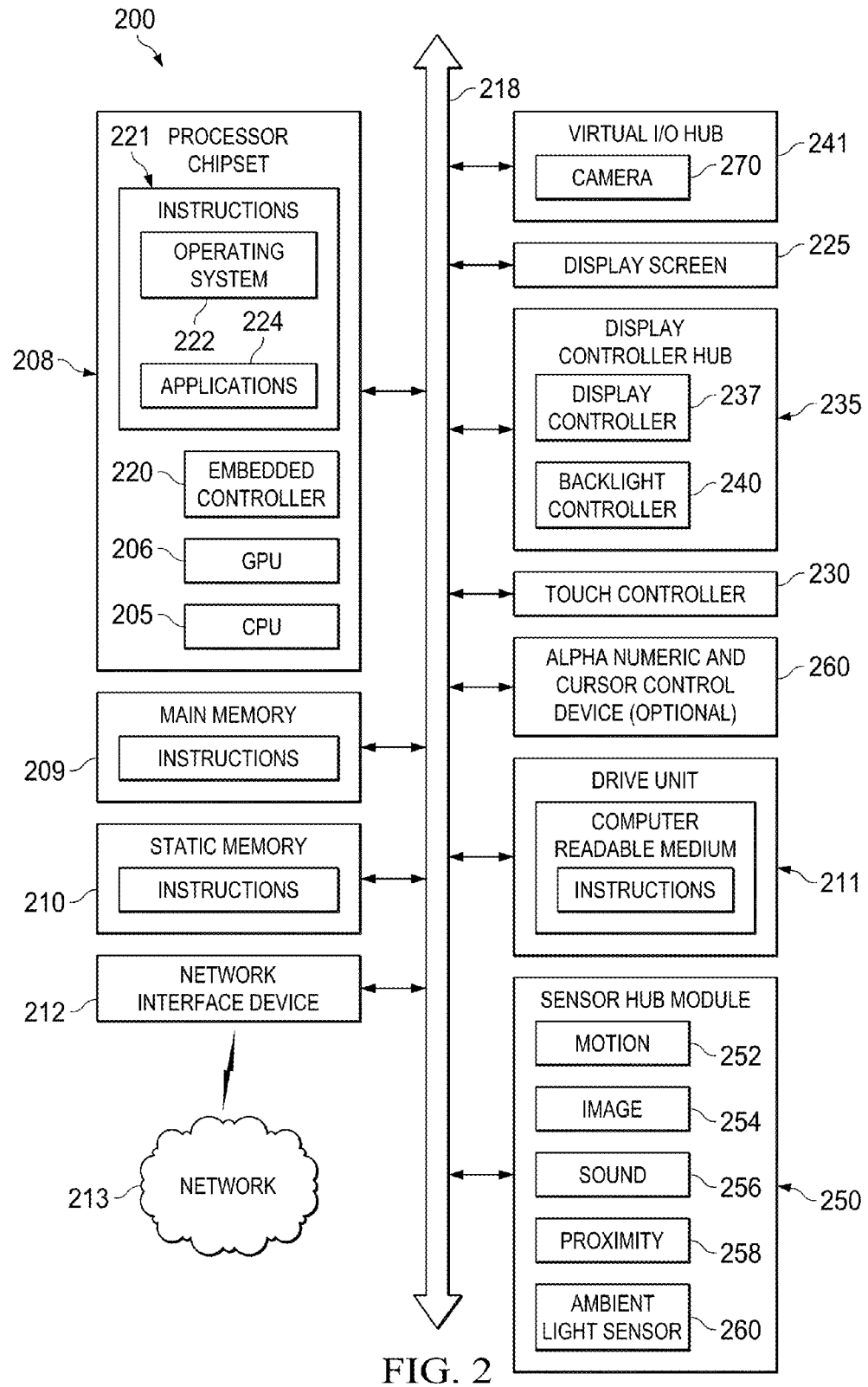
FIG. 2 is a diagram of an example of an Information Handling System (IHS) configured to provide a dynamic user interface for multiple shared displays in an electronic collaboration setting according to some embodiments.

FIG. 2 shows Information Handling System (IHS) 200 configured to provide a user interface for virtual meetings with multiple shared displays. In various embodiments, IHS 200 may include a set program instructions that can be executed to cause the IHS to perform any one or more of the methods or operations disclosed herein.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a tablet, a PDA/smartphone, a consumer electronic device, a network server or storage device, a switch router, wireless router, or other network communication device, or any other suitable device and may vary in size, shape, performance, functionality, and price.

In a particular embodiment, IHS 200 can be implemented using electronic devices that provide voice, video or data communication. In a networked deployment, IHS 200 may operate in the capacity of a server or as a client user computer in a server-client user network environment, or as a peer computer system in a peer-to-peer (or distributed) network environment. Further, while a single IHS 200 is illustrated, the term "system" shall also be taken to include any collection of systems or sub-systems that individually or jointly execute a set, or multiple sets, of instructions to perform one or more computer operations.

IHS 200 includes memory 209, one or more processing resources such as a Central Processing Unit (CPU) 205 or hardware or software control logic, and operates to execute code. Additional components of IHS 200 may include main memory 209, one or more storage devices such as static memory or disk drives 211. These memory devices 209 and 211 can store code and data. In various embodiments, memory 209 and 211 may be implemented using any suitable memory technology, such as static RAM (SRAM), synchronous dynamic RAM (SDRAM), nonvolatile/Flash-type memory, or any other type of memory.

Other components include one or more communications ports for communicating with external devices as well as various input and output (I/O) devices. I/O devices may include alphanumeric and cursor control devices 260 such as a keyboard, a touchpad, a mouse, one or more video display devices 225, display touchscreen(s) with touch controllers 230, and one or more cameras 270 including camera controllers. IHS 200 may also include one or more buses 218 operable to transmit communications between the various hardware components.

Again, IHS 200 may include one or more processing resources such as CPU 205, Graphics Processing Unit (GPU) 206 that may or may not be integrated with CPU 205, and related chipset(s) 208 or hardware or software control logic.

In various embodiments, IHS 200 may be a single-processor system including one CPU or a multi-processor system including two or more CPUs (e.g., two, four, eight, or any other suitable number). CPU(s) 205 may include any processor capable of executing program instructions. For example, in various embodiments, CPU(s) 205 may be general purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 205 may commonly, but not necessarily, implement the same ISA.

IHS 200 may include several sets of instructions 221 to be run by CPU 205, GPU 206, and any embedded controllers 220 on IHS 200. One such set of instructions includes Operating System (OS) 222 with an OS interface.

Example OSs 222 can include those used with typical mobile computing devices such as Windows Phone mobile OS from Microsoft Corporation and Android OS from Google Inc. Additional sets of instructions in the form of multiple software applications 224 may be run by IHS 200. These applications 224 may enable multiple uses of IHS 200, as set forth in more detail below. Particularly, applications 124 may include program instructions configured to provide a user interface for virtual meetings with multiple shared displays, as discussed in several embodiments.

IHS 200 may operate as a standalone device or may be connected such as by using a network, to other computer systems or peripheral devices. IHS 200 can represent a server device whose resources can be shared by multiple client devices, or it can represent an individual client device, such as an individual mobile personal computing system.

IHS 200 has network interface device 212, such as for a wireless cellular or mobile networks (CDMA, TDMA, etc.), WIFI, WLAN, LAN, or similar network connection, enabling a user to communicate via a wired or wireless communications network 213, such as the Internet. IHS 200 may be configured with conventional web browser software. The web browser may include for example Microsoft Corporation's Internet Explorer web browser software, Firefox or similar such browsers to allow the user to interact with websites via the wireless communications network 213.

IHS 200 also includes one or more display devices 225 that may utilize LCD, OLED, or other thin film technologies. Each display device 225 may be capable of touch input via touch controller 230. Each display device 225 has a display controller hub 235. The display controller hub 235 may include control logic and software or access separate control logic and software. Components may include a display controller or driver 237 and a backlight controller 240 for LCD thin film display technologies or a brightness controller for OLED/AMOLED technologies. The one or more parts of the display controller hub 235 may be operated by or integrated with one or more graphics processing units (GPUs) 206 such as those that are part of the chipset 208. The display device 225 and one or more parts of the display controller hub 235 may also be controlled by the embedded controller 220 of chipset 208. Each GPU 206 and display controller/driver 237 is responsible for rendering graphics such as software application windows and virtual tools on the display device 225.

IHS 200 may include one or more integrated camera systems 270 with one or more camera drivers. Some cameras 270 may operate in accordance with normal usage as a webcam or such as those that may be mounted on a back surface for standard image taking with the IHS 200. Image taking or image capture can refer to any type of camera operation whether still image capture, video, or other functions or for other purposes.

Alternatively, any one or all of camera(s) 270 may be used as part of a virtual I/O device hub 241 to capture images of gesture as part of the disclosure embodiments described below. Camera(s) 270 may be part of or connected to the virtual I/O device hub 241 for those having free space gesture capture capabilities. For example, a camera operating as an I/O input device for gestures may also have a dual function and be used for image capture purposes in other embodiments.

Some or all of the camera(s) 270 may be infrared (IR) cameras or near-infrared cameras for use in low light or other difficult light settings or camera(s) 270 may operate in a typical visible light spectrum. It should be noted that camera(s) mounted in other locations may similarly act as virtual I/O input devices with the virtual I/O device hub 241 to capture free space gestures according the systems and methods disclosed in embodiments herein.

Additional components may be integrated in IHS 200 to work in connection with virtual I/O input hub 241. Such additional hardware may include an image sensor or proximity sensor, such as a low resolution IR or near IR camera, to detect a user's hand location and movement. Additionally, a second camera or IR system may act as a depth sensor to detect location of a hand and orientation of palm and fingers in proximity to the camera and IHS 200. For instance, a second camera may serve as additional image sensor hardware. Cameras 270 may also be capable of capturing either two dimensional or three dimensional imagery of gesture actions and may incorporate multiple image capture components or cameras 270 as necessary to capture gesture images for interpretation to commands. Also, projection of a gesture boundary via a laser or LED projection system may be employed as additional hardware integrated into IHS 200. Further description of the camera virtual I/O input device system is described below as is additional description of additional integrated functionality and hardware for use in conjunction with the gesture detection camera for I/O inputs to the IHS 200.

IHS 200 also has a system sensor module or component 250, including motion sensors 252, image sensors 224, sound sensors 256, proximity sensors 258, and Ambient Light Sensor (ALS) 260. Sensor system module 250 is a sensor hub, or an accumulator device, that collects raw data from connected orientation sensors, and organizes and processes data received from the connected sensors. Such a sensor hub may be an independent microcontroller such as the STMicro Sensor Fusion MCU as well as other microcontroller processing systems. Alternatively, the sensor and fusion hub may be integrated into a core processing chipset such as CPU systems for mobile devices as available from Intel™ Corporation or may utilize ARM Core processors that serve as single or multiple core processors in alternative chipset systems. The sensor hub may communicate with the sensors and chipset 108 via a bus connection such as an Inter-Integrated Circuit ($I^2C$) bus or other suitable type of multi-master bus connection. Sensor data may impact location of expected free space gestures and orientation of a gesture detection boundary and gesture detection plane.

Figure 3:
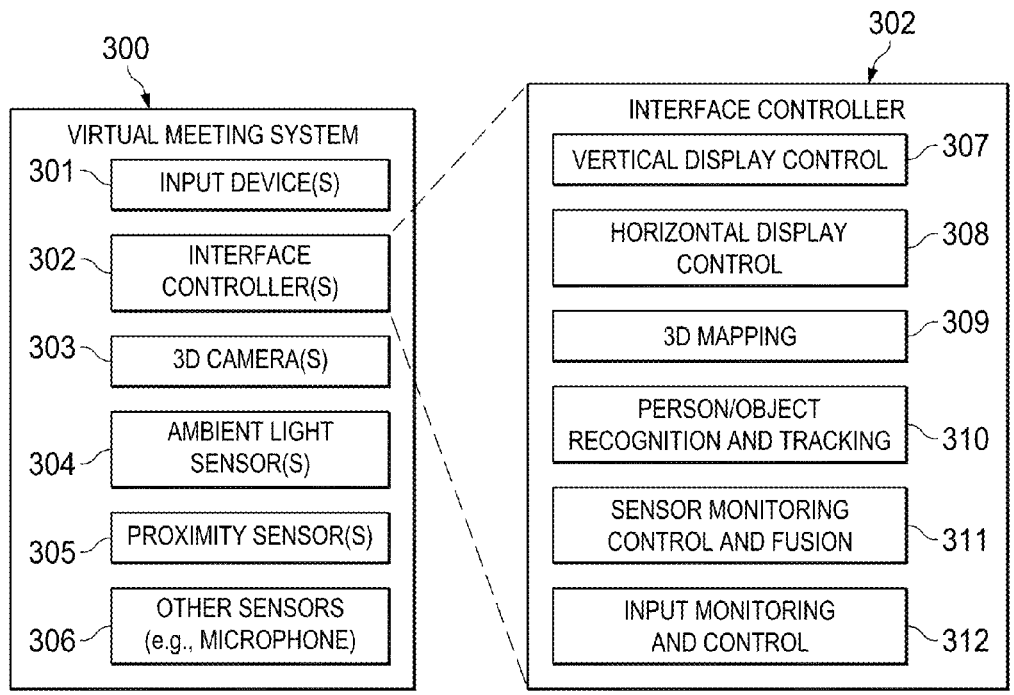
FIG. 3 is a diagram of an example of a system according to some embodiments.

FIG. 3 is a block diagram of an example of virtual meeting system 300 according to some embodiments. Generally speaking, virtual meeting system 300 may operate to manage an electronic meeting, presentation, conference, collaboration, work group, etc., while providing a user interface for virtual meetings with multiple shared displays. In various implementations, IHS 200 of FIG. 2 may execute program instructions for providing virtual meeting system 300. An Application Programming Interface (API) may enable interaction between virtual meeting system 300, device drivers, and other aspects of IHS 200 and its program instructions.

Virtual meeting system 300 may connect to a bus of IHS 200 indirectly through network 213 and network interface device 212, or may connect directly to the network interface device 212 via the network channels (not shown). Virtual meeting system 300 may also connect directly to the bus of IHS 200.

Additionally or alternatively, virtual meeting system 300 may be implemented in hardware. For example, a portion of virtual meeting system 300 and interface controller 302 may include hardware such as, for example, an integrated circuit (such as an Application Specific Integrated Circuit (ASIC), a Field Programmable Gate Array (FPGA), a structured ASIC, or a device embedded on a larger chip), a card, or a system (such as a motherboard, a system-on-a-chip (SoC), or a stand-alone device). Virtual meeting system 300 may also have some or all parts to include software, including firmware embedded at a device, capable of operating a relevant environment of IHS 200. In some cases, virtual meeting system 300 may include a combination of the foregoing examples of hardware or software.

In the example shown in FIG. 3, virtual meeting system 300 includes input device component 301, interface controller component 302, three-dimensional (3D) camera component 303, Ambient Light Sensor (ALS) component 304, proximity sensor component 305, and other sensor components (e.g., audio) 306. Each component may include a hardware device, program instructions, drivers, APIs or any combination thereof.

In various embodiments, virtual meeting system 300 may acquire and process data regarding a three-dimensional image of one or more presenter(s), participant(s), and/or object(s), as captured by cameras 108 and/or 111 in FIG. 1, for example. In some embodiments, camera component 303 works together with 3D mapping component 309 and person/object recognition and tracking component 310 of interface controller 302 to determine the 3D location of a participant and/or a non-participant object in a three-dimensional space, render a virtual three-dimensional environment (e.g., including a three-dimensional image of a participant and/or a non-participant object), and identify and/or render a user interface plane on one or more displays (e.g., displays 101 and 102).

In a further embodiment, interface controller 302 may receive and process data received from input devices 301 via input monitoring and control component 312. Interface controller 302 may also receive and process data from camera component 303, ALS sensors 304, proximity sensor(s) 305, and other sensor(s) 306 via sensor monitoring, control, and fusion component 311. Data received from these various and sensors and processed by sensor monitoring, control, and fusion component 311, and input monitoring and control component 312 may allow interface controller 302 to perform operations such as, for instance, determining the three-dimensional location of a participant in an image captured at different points in time and determining whether a participant's location has changed (e.g., using camera component 303 and proximity sensor(s) 305).

To this end, interface controller 302 may access a 3D image of a participant (or object) data describing the participant (or object) within the image. Interface controller 302 may also access a second 3D image of participants taken at a second instance in time and data describing the identification of the participant at the second instance in time. A series of 3D images may be displayed for a participant and/or objects such that the movement of the three-dimensional image of a participant and/or object may operate as a video or an avatar substitute may track movements of the three-dimensional image of a participant or object.

Interface controller 302 may operate to display a graphical element on each display in the location of the electronic meeting, or in any other location (e.g., a remote location distinct from the environment 100), for example, using vertical display control component 307 and/or horizontal display control component 308. In an embodiment, interface controller 302 may operate to display a 3D image of a presenter on a remote observer's display. Vertical display control component 307 and/or horizontal display control component 308 may also enable interface controller 302 to control certain aspects and settings of each display (e.g., brightness, color, contrast, etc.).

Interface controller 302 may also access receive and process data including: an electronic meeting's environment, a participant's location and identification, an object's location an identification, a gesture or other command (e.g., voice) issued by a participant, a proximity of a participant to a display or smart desk, an ambient environment (e.g., ambient lighting, temperature, etc.), profiles and preferences associated with a participant, etc.

Interface controller 302 may also operate to detect an input command from a participant to manipulate a presentation graphical display element. In an embodiment, the input device component 301 may receive an input command in the form of a keyboard entry, mouse entry, voice command, gesture command, or touch screen entry given in order to affect manipulation of a presentation graphical display element, and software instructions regarding manipulation of the electronic shared presentation graphical display element, as commanded. In another embodiment, a user input device may be a stylus, pen, or wearable cursor control or other input device that may transmit location data with respect to an electronic, shared presentation. Intersection of the plane of operation of the user input device and the electronic, shared presentation may indicate execution of commands or input to the presentation application by one or more participants.

As noted above, interface controller 302 may be configured to identify a command (e.g., a voice command or a gesture) made by a participant, and/or identify the intent of a participant in issuing that command, for example, by analyzing video and/or audio cues, before, during, and/or after the command is issued.

Figure 4:
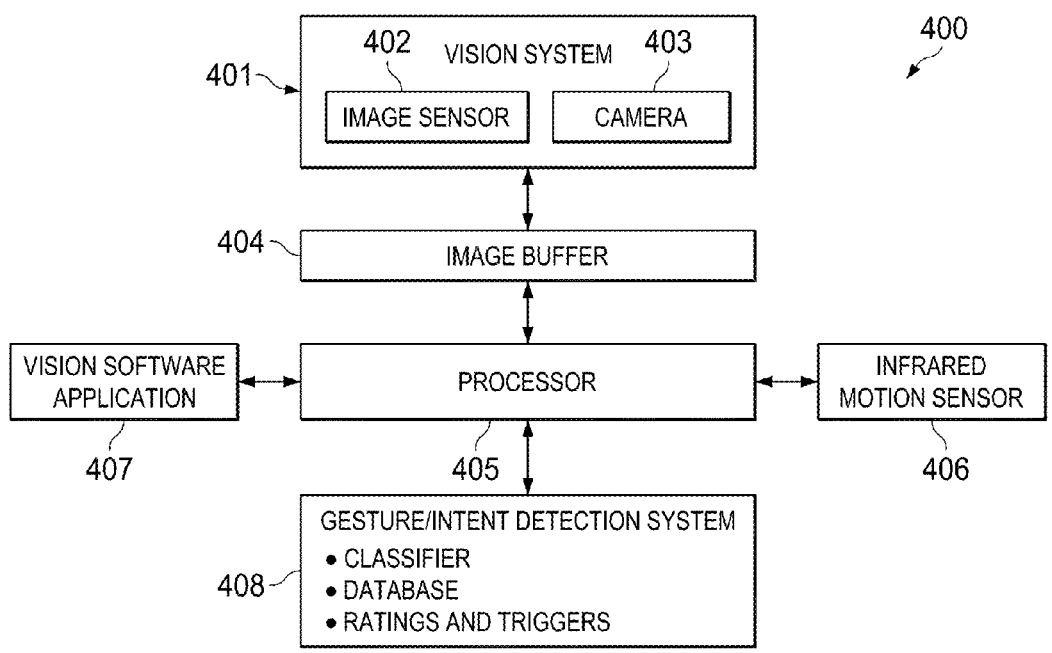
FIG. 4 is a diagram of an example of a gesture/intent detection system according to some embodiments.

FIG. 4 is a block diagram of an example of gesture/intent detection system 408 according to some embodiments. As illustrated, gesture/intent detection system 408 represents a combination of aspects of 3D mapping component 309, person/object recognition and tracking component 310, sensor monitoring, control, and fusion component 311, and/or input monitoring and control component 312 of interface controller 302 within virtual meeting system 300.

In an embodiment, gesture/intent detection system 408 may operate to detect and interpret gestures as I/O input. Such a gesture/intent detection system 408 may be code run on CPU 205 or GPU 206 via chipset 208. Alternatively, the gesture detection system 408 may be firmware or software code instructions operating on a separate controller or processor. For example, gesture/intent detection system 408 may operate on or in close connection with vision system 401, which includes image sensor 402 and camera 403.

Gesture/intent detection system 408 illustrates a subset of elements of IHS 200 that enable free space gesture inputs. This subset including hardware, firmware, and software elements for controlling a vision system 101, including camera 403 and image sensors 402. Gesture/intent detection system 408 executes code in software or firmware on processor chipset(s) 208 for gesture detection and interpretation, and coordinates gesture images and data. Alternatively, the code in software or firmware may be executed on a separate processor or microcontroller or may be hard coded into an ASIC designed to perform some or all of the operations of the gesture/intent detection system 408.

Generally speaking, gesture/intent detection system 408 is configured to identify a user's hand and elements of the user's hand relevant to the gestures including a palm and one or more fingers that may perform gestures. Gesture/intent detection system 408 interprets gesture movements by a user's hand into commands for selection and manipulation of a cursor or elements displayed by OS 222 or application 224 running on IHS 200. In an example, gesture/intent detection system 408 may also maintain a gesture detection plane and hand orientation. In another example, gesture/intent detection system 408 may detect OS 222 or applications 224 to be run on IHS 200 to determine what type of gestures may need to be supported for I/O input operations, such as cursor control or the like.

In operation, camera 403 and image sensors 402 of vision system 401 calibrate a detection zone and gesture detection plane. Additionally, camera 403 and image sensors 402 may detect and capture images of gestures for input to virtual I/O hub 241. These images are buffered in image buffer 404 and then provided to processor chipset 405 or other processing device as needed by the gesture detection system 242. Gesture/intent detection system 242 may include several subcomponents that may be used to interpret the free space gesture images captured by vision system 401. Software application 407 includes program instructions that determine the type of gestures supported by the active software application running on IHS 200 at the time virtual I/O inputs are being used. For example, gesture/intent detection system 408 may also determine whether cursor control functions such as clicks, item selection, scrolling, highlighting, drawing, writing, and other I/O functions are available.

Gesture/intent detection system 408 may include a gesture classifier to determine the type of gesture being detected. Examples of gesture types available include orientation of the gesture such as whether gestures are being received by a left hand or right hand or if the free space gestures are being input in a hover position. Additional classification may include the type of user indication device being used to perform free space gestures for input. User indication devices may include a user's hand, pen or pencil, stylus or similar devices.

Classification of gestures may also depend on the category of gestures being received. For example, one gesture detection category may be determined to be virtual mouse gestures based on the gesture images captured. Detection of a virtual mouse click or the slide of a palm on a gesture detection plane may indicate virtual mouse gestures. Another example classification may include virtual trackpad inputs such as a detection of a finger touch and finger lateral movement on a gesture detection plane.

Gesture/intent detection system 408 may include a signal module to take the buffered images of block 404 and provide interpretation by sequencing images in preparation for rating and comparison with images stored in a gesture database. Such a gesture database may have data representing multiple gestures available within a classification. For example, a right hand virtual mouse gesture classification may include palm slides, virtual mouse clicks, virtual click and hold, virtual scroll wheel and other gestures. Additional database entries may include classifications for virtual touchpad gestures or pen/pencil/stylus gestures. A virtual touchpad gesture may include one finger touch, multiple finger touches, touchpad clicks, and virtual touches to activation buttons as are understood by those of ordinary skill in the art as mimicking actual touchpad technology.

In some cases, variations to virtual mouse or virtual touchpad modes may be enabled for the convenience of the user's or to improve upon the limitations of the mimicked actual I/O devices. For example, additional gestures may be implemented including variations from a typical mouse or typical touchpad operation. This may include virtual clicks or virtual finger touches with different fingers or multiple fingers or other detectable movements of the user's hand. A separate set of gestures may be stored in the gesture database for each of the gesture classification. For example, a similar set of virtual mouse gestures or virtual trackpad gestures may be available for a user's left hand from a left side mount camera or a re-oriented information handling system such as a tablet or other mobile device. Yet another set of virtual mouse gestures may be available for any position for gestures from either hand.

Gesture/intent detection system 408 may also include a rating and trigger table, or the like. Once a gesture classification is determined according to motion of a user's hand or other user indication device, the captured images of the gesture are compared with data for the gestures in that classification from the gesture database. A rating is assigned to the gesture based on its correspondence to the stored gesture from the gesture database. If the rating of the gesture motion from the images meets a threshold, the detected free space gesture triggers an action in IHS 200. The action may be cursor control or selection of an element of a software application running on the information handling system. Other actions may include those allowed in the detected application software running on IHS 200.

Examples of participants' gestures may include, but are not limited to, "need to speak," "pointing," and "voting." When a participant indicates heir need to speak during an electronic collaboration session, he or she may employ user-definable gestures such as detection of raising their hand, waving their hand, or cupping ears. Virtual meeting system 300 may then determine that the participant needs a turn to speak or interact, and may provide a user interface to that participant to effect the participant's intent. As another example, virtual meeting system 300 may identify a displayed element that the participant would like to emphasize or highlight—e.g., by pointing to it—and that action may cause a corresponding area on the shared display to be highlighted. Detection capabilities may also allow users' pinching and tapping-type gestures, among others.

In another embodiment, processor 405 may receive sensory inputs such as infrared (IR) motion sensor component 406. The IR motion sensor component 406 detects proximity of a hand or pen or other user indication device. IR motion sensor component 406 triggers the system to begin to calibrate and detect gestures for input into the virtual I/O and capture of gesture images for interpretation by the gesture detection system in accordance with the disclosures herein. It is understood that variations on the several example disclosures herein are possible for a gesture detection system and the virtual I/O hub devices to calibrate, detect, capture and interpret free space gestures for input to an information handling system.

In some cases, a laser projector (not shown) may be integrated with an IR camera used with IR motion sensor component 406. In an embodiment, the laser projection module shines a laser on a hand or other user indication at a plurality of points. For example, two or more laser points are shined. Using the laser points, the IR camera may detect motion of the user's hand or other gesture indication device including direction vectors, velocity, acceleration and other dimensional movement. If the movement detected using the laser projection module and IR motion sensor component 406 meets a threshold of detected motion in the free space gesture zone, system 408 initiates and the aforementioned operations may be turned on. An example threshold may be a detected velocity of the hand or user indication that meets a threshold velocity (e.g., 1 ft/s). Velocity, acceleration, and/or direction vectors may be included as thresholds required to trigger the gesture detection system via virtual I/O hub 241.

The laser projection module may be integrated with the IR camera of IR motion sensor component 406 or may be a separate device of IHS 200. In addition to the embodiment above, a laser projection module, whether or not integrated with the IR camera, may also be used to project virtual working boundaries of a virtual gesture detection plane.

In another embodiment, however, such a projection module may not necessarily be laser light projection. For example, a LED or other light source may be used to approximately illuminate the virtual gesture detection plane for free space gestures. In an embodiment, this light may be focused, for example variably focused, to approximate a virtual working boundary for free space gestures.

In various embodiments, gesture/intent detection system 408 may employ the gesture recognition technology described with or without other inputs from other sensors (e.g., using a fusion algorithm or the like) to discern a participant's intent. As noted above, gesture/intent detection system 408 may include optical sensing technology and/or object tracking technology, and may be implemented as a camera, a three-dimensional camera or body sensor, an infrared sensor, or the like configured to detect body orientation, head orientation or gaze, and/or hand location/movement.

Examples of participants' intent detectable by gesture/intent detection system 408 include intent to open, draw, move, erase content on a display, intent to point, intent to speak, intent to become a presenter or a non-presenting participant, etc. Additionally or alternatively, other features may be used to interpret gestures for presentation control (e.g., next slide, previous slide, undo, redo, start blank presentation, projector control such as volume, brightness, etc.). It should be noted, however, that these different intents and actions may be extended to implement other intents or actions that are useful for virtual meeting interactions, with additional input criteria that are appropriate for the new actions.

In operation, gesture/intent detection system 408 receives an indication of body movement or motion. Examples of body movement include, but are not limited to, face orientation, leaning toward a particular display, gaze orientation or direction, and hand or wrist articulation/location/movement. Gesture/intent detection system 408 may also determine whether a participant is facing a display, their own hands, etc. For instance, gesture/intent detection system 408 may be configured to determine whether a participant's wrist is in a relaxed or flexible state. If so, then gesture/intent detection system 408 may identify the user's intent to draw when making a particular gesture, otherwise gesture/intent detection system 408 may detect the participant's intent when making the same gesture as an intent to erase.

As another example, gesture/intent detection system 408 may determine whether the user is facing the audience (e.g., other in-room participant(s), a broadcasting camera, etc.). If not, gesture/intent detection system 408 determines if the user's wrist is rigid. If the user's wrist is not rigid, gesture/intent detection system 408 identifies the user's intent to point. Other non-limiting examples of actions and the resulting detected intent are summarized below:

TABLE I

| Input/Attribute | Intended Action Classification | | |
| --- | --- | --- | --- |
| | Draw | Erase | Point |
| Face orientation | Facing display | Facing display | Facing audience |
| Gaze | Looking at hand | Looking at hand | Looking at audience |
| Active Object (pen, totem, laser pointer) | Directing Pen | Activating/ Sudden Move | Rotating/ Directing to a Point |
| Wrist articulation | Flexible | Rigid | Rigid |

Coordination of vision system 401, gesture/intent detection system 408, and IR motion sensor component 406 of virtual I/O hub 241 may involve control of camera 403 and gathering of gesture images for interpretation by the gesture/intent detection system 408 operating via processor 405, such as processor or chipset 208. Coordination occurs via instructions running on or between elements of the processor chipset or an external controller such as an MCU associated with the gesture/intent detection system 408. This may include CPU, embedded controllers, and camera controllers, executing all or parts of instructions for capturing free space gesture images for interpretation into information handling system control commands such as cursor control. CPU 205, embedded controller, MCU, camera controllers or other processors may coordinate via the IHS's API.

The API coordinates the various elements of program instructions run on one or more processors in the chipset or controllers associated with the elements of vision system 401, their drivers, and the gesture/intent detection system 408. These program elements may comprise the systems or perform the methods described herein that comprise the disclosed methods and systems including several features of gesture/intent detection system 408.

Figure 5:
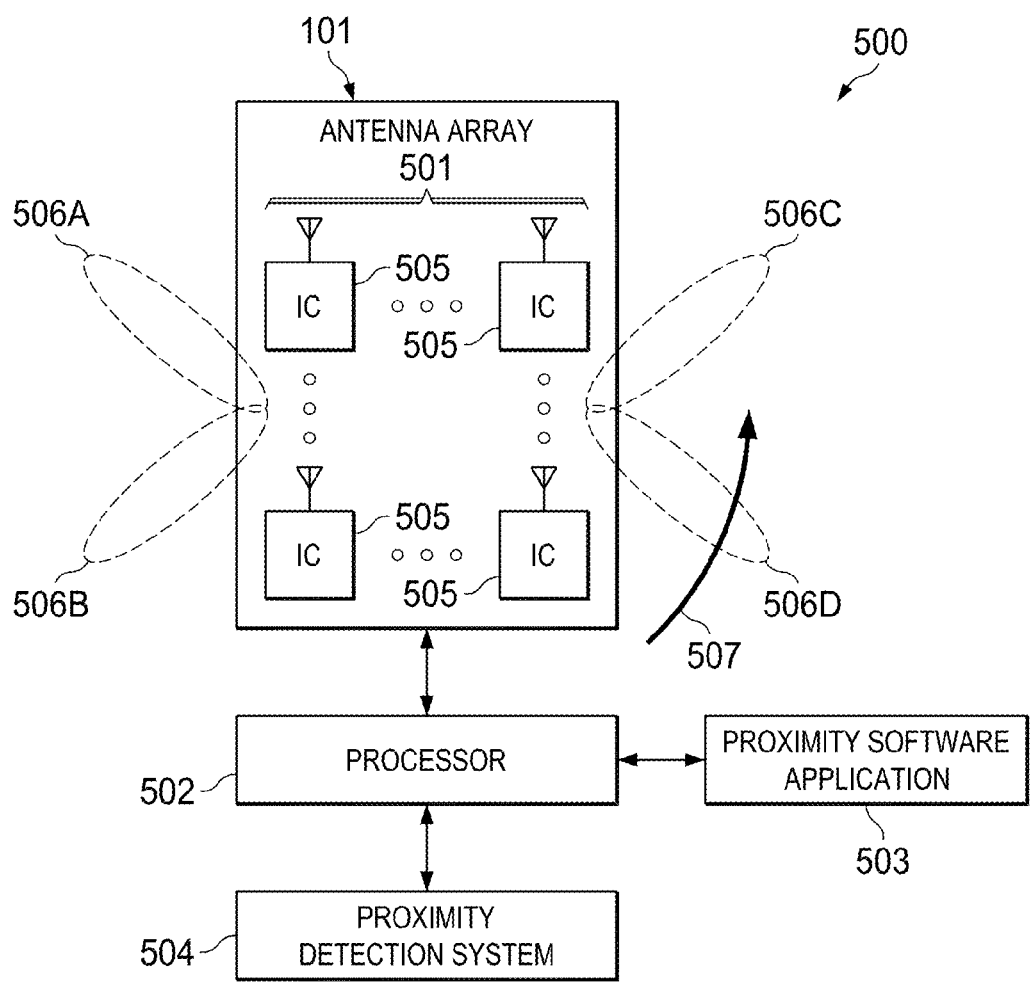
FIG. 5 is a diagram of an example of a proximity detection system according to some embodiments.

FIG. 5 is a block diagram of an example of proximity detection system 504 according to some embodiments. As illustrated, system 500 represents a combination of aspects of person/object recognition and tracking component 310, sensor monitoring, control, and fusion component 311, and/or input monitoring and control component 312 of interface controller 302 within virtual meeting system 300.

In the embodiment shown, antenna array 501 may be used as one or more of proximity sensor(s) 258, and may be implemented as a series of Radio Frequency (RF) antennas or antenna arrays 505 in combination with integrated circuits or controllers. Proximity data sensed by antenna array 501 may be received by processor 502 (e.g., CPU 205), which executes program instructions in the form proximity application or software library 503 to result in proximity detection system 504.

In some cases, antenna array 501 may include a phased array antenna at 26, 60, 76 or 300 GHz, configured to directionally track a participant's position and movement 507 with respect to displays 101 and/or 102 using wireless, steerable power lobes 506A-D. For example, one or more sensor arrays such as antenna array 501 may be used around or outside the perimeter of displays 101 and/or 102. Using these frequencies, a wireless power lob may be directed and switched at approximately a 1 to 2 m distance from the array. For example, beam steering application may receive feedback from voice and ALS sensors based upon 60, 80, and 300 GHz antenna and SAR. Sensors are evaluated and compared with a periodic cooperation in a real environment.

The power reflection coefficients at the air and skin interface at 60 GHz for parallel and perpendicular polarized components shows that 34-42% of the normal incident power is reflected at the skin surface at that frequency, which may be higher at 300 GHz. By detecting SAR using the reflected power, a map of movement and location can be achieved.

In some cases, it may be critical to switch between the various frequencies. For example, based on obstacle and quality of signal, moving between 60 GHz and 300 GHz is found to be significantly advantageous.

In some embodiments, one antenna may be disposed at each corner of display 101, as part of a smart table. Additionally or alternatively, acoustic transducers may be used. For example, an acoustic sensor may be configured to track up to 2 or 3 persons (e.g., if 2 people are talking in a conference room or discussing), and the visual sensor may be configured to support tracking when the acoustic sensor has difficulty.

Figure 6:
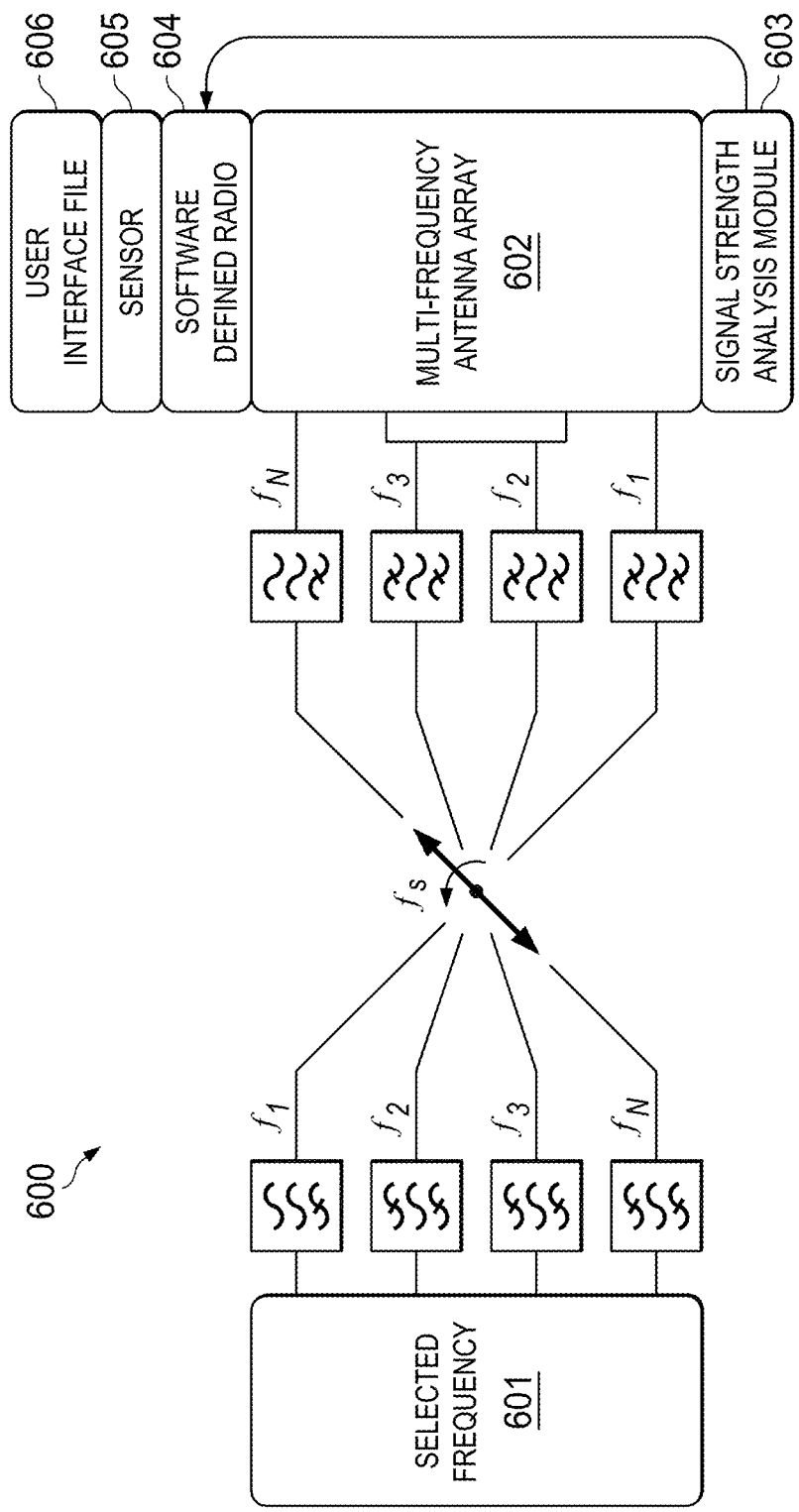
FIG. 6 is a diagram of an example of a switching system according to some embodiments.

FIG. 6 is a diagram of an example of switching system 600 according to some embodiments. As illustrated, system 600 represents a combination of aspects of person/object recognition and tracking component 310, sensor monitoring, control, and fusion component 311, and/or input monitoring and control component 312 of interface controller 302 within virtual meeting system 300.

In the embodiment shown, frequency selection block 601 selects one or more frequencies $f_1$-$F_N$, for example, for operating an ambient light sensor or the like. Frequency selection block 601 includes a correspondence between different sensors such that a given frequency of operation for the ALS sensor corresponds to a second frequency of operation for another sensor which, in this example, is a proximity sensor such as sensor 258 and/or 501. In this example, multi-frequency antenna array 602, signal strength analysis component 603, software defined radio 604, sensor 605, and user interface (UI) file 606 may be used and/or executed in order to perform one or more of the various operations described herein. For example, components 601-606 may be used to implement one or more sensor fusion operations.

Presentation Interface in an Electronic Collaboration Session

In various embodiments, an electronic collaboration session may be moderated by an IHS that records, analyzes, and determines a number of participants in the room, identifies of one or more participants, identifies which participants are active and which are not, identifies the role of different participants in the session, identifies the position and physical movement of each participant, identifies any participant's gestures and/or intent, etc. This information may be obtained, for example, using a combination of 3D camera data and millimeter wave proximity sensor data.

Moreover, based upon the aforementioned information, the IHS may provide a user interface individualized to each participant, in some cases across a plurality of discrete displays. Features of such an user interface may be selected based upon any of the foregoing information, and may change over time during a session as different participants take different roles and/or physically move within the meeting room.

Figure 7:
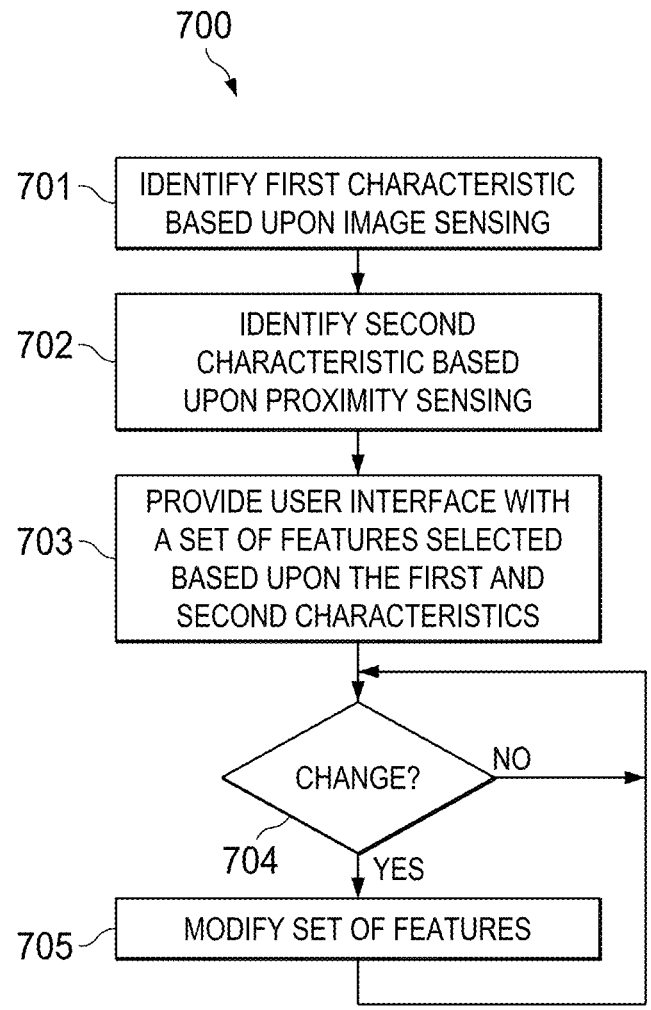
FIG. 7 is a flowchart of an example of method for providing a dynamic user interface for multiple shared displays in an electronic collaboration setting according to some embodiments.

Turning to FIG. 7, a flowchart of an example of method 700 for providing a presentation interface in an electronic collaboration session is depicted according to some embodiments. In some cases, method 700 may be implemented using virtual meeting system 300 provided by IHS 200 disposed in environment 100. In this example, IHS 200 also includes an implementation of gesture/intent detection system 408, proximity detection system 504, and switching system 600.

At block 701, method 700 identifies a first characteristic associated with a given one of a plurality of participants of an electronic collaboration session, at least in part, using an image sensing device. At bock 702, method 700 identifies a second characteristic associated with the given participant, at least in part, using a proximity sensing device.

In some cases, the image sensing device includes a 3D camera (e.g., cameras 108 or 111 part of vision system 401). The first characteristic may include a position of the given participant in three-dimensional space, an identity of the participant, a size or reach of the participant, a role of the participant in the electronic collaboration session, a gesture made by the given participant, an intent of the given participant, etc. Moreover, the proximity sensing device may include a millimeter RF wave sensor (e.g., antenna array 501 part of proximity detection system 504). The second characteristic may include a position of the given participant relative to another participant or a display, a specific absorption rate of a participant, etc.

Then, at block 703, method 700 provides a user interface having a first set or one or more features selected, at least in part, based upon the first and second characteristics.

Block 703 may employ rules to calculate the relative importance or weight of each of the first and second characteristics. For example, the first characteristic of block 701 may include a numerical quantification of a participant's body movement, and second characteristic of block 702 may include a numerical quantification of a distance between the participant and a reference point. In some cases, the numerical quantification may include a certainty that an action or movement has taken place. For example, block 601 may determine that a participant is facing a screen with 80% certainty. Furthermore, block 603 may associate a selected weight (e.g., 0.9) that represents how important the user's facing direction is, relative to other user movements or actions, to the determination of that user's intent. Block 703 may then calculate a weighted average between the various numerical quantifications.

Based upon the weighted average of block 703 and/or profiles associated with each participant and/or the electronic collaboration session, the different sets of features for different user interfaces presented to each participant at different times can vary dynamically during the session.

The user interface may be a GUI, a speech recognition interface, or a gesture recognition interface. The first set of one or more features may include a size or area of the GUI on a display device. Additionally or alternatively, the first set of one or more features may include at least one of: an image, an icon, a menu, a file, a folder, a script, a software application, or an Operating System (OS). Additionally or alternatively, the first set of one or more features may include an available voice or gesture command.

At block 704, method 700 determines if either the first or second characteristic has changed. If not, control remains with block 704. Otherwise, the set of features selected at block 703 may be modified into or replaced with a second set of features in a manner corresponding to the change.

For example, in response to the change indicating that a given participant's role in the electronic collaboration session has increased (e.g., from non-speaking to speaking participant, or from member to moderator), the second set of features may be larger than the first set of features (e.g., larger or richer interface, exclusive commands, etc.). Conversely, in response to the change indicating that the given participant's role in the electronic collaboration session has decreased, the second set of features may the smaller than the first set of features.

Additionally or alternatively, in response to the change indicating that the given participant has moved closer to a display, the second set of features may be larger than the first set of features, and in response to the change indicating that the given participant has moved farther from the display, the second set of features may be smaller than the first set of features.

As discussed above, the electronic collaboration session may use a plurality of distinct screens (e.g., 101 and 102) visible to the plurality of participants. In some cases, these screens may be orthogonal with respect to each other. For example, a first screen may be part of a horizontal display device (which in turn may be part of a smart table or the like), and the second display may be part of a vertical display device. Moreover, the horizontal and vertical display devices may be arranged with gap 103 in between that allows a given participant 104 to stand between the display devices 101 and 102.

In various embodiments, providing the user interface may include determining that the given participant is standing in the gap and splitting the user interface into a first portion and a second portion. For example, the first portion may be displayed on a first display device with a first subset of features, and a second portion may be displayed on a second display device with a second subset of features. The first subset of features may include public information public with respect to the plurality of participants (e.g., shared documents, presentation or playback commands, etc.), and the second subset of features may include private information with respect to the given participant (e.g., personal documents, exclusive commands, etc.).

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   one or more processors; and
   a memory coupled to the one or more processors, the memory including program instructions stored thereon that, upon execution by the one or more processors, cause the IHS to:
      identify a first characteristic associated with a given one of a plurality of participants of an electronic collaboration session, at least in part, using an image sensing device;
      identify a second characteristic associated with the given participant, at least in part, using a proximity sensing device;
      provide the given participant with a user interface for the electronic collaboration session, the user interface having a set of one or more features selected, at least in part, based upon the first and second characteristics;
      determine, based upon the first and second characteristics, that the given participant is standing in a gap between a horizontal display device and a vertical display device; and
      in response to the determination, split the user interface of the given participant into a first portion and a second portion, wherein the first portion is displayed on the horizontal display device with a first subset of the one or more features, wherein the second portion is displayed on the vertical display device with a second subset of the one or more features, and wherein the first and second subsets of the one or more features have different privacy levels.

2. The IHS of claim 1, wherein the image sensing device includes a three-dimensional (3D) camera and wherein the proximity sensing device includes a millimeter Radio Frequency (RF) wave sensor having an antenna array.

3. The IHS of claim 1, wherein the first characteristic includes at least one of: an identity of the given participant, a role of the given participant in the electronic collaboration session, a gesture made by the given participant, or an intent of the given participant.

4. The IHS of claim 1, wherein the second characteristic includes a position of the given participant relative to another participant.

5. The IHS of claim 1, wherein the user interface includes at least one of: a Graphical User Interface (GUI), a speech recognition interface, or a gesture recognition interface.

6. The IHS of claim 1, wherein the set of one or more features includes a size or area of the GUI on a display device.

7. The IHS of claim 1, wherein the set of one or more features includes at least one of: an image, an icon, a menu, a file, a folder, a script, a software application, or an Operating System (OS).

8. The IHS of claim 1, wherein the set of one or more features includes an available voice or gesture command.

9. The IHS of claim 1, wherein the program instructions, upon execution, further cause the IHS to:
    detect a change to at least one of the first or second characteristics during the electronic collaboration session; and
    provide a user interface having another set of one or more features selected, at least in part, based upon the changed characteristic.

10. The IHS of claim 9, wherein in response to the change indicating that the given participant's role in the electronic collaboration session has increased, the other set of features is larger than the set of features, and wherein in response to the change indicating that the given participant's role in the electronic collaboration session has decreased, the other set of features is smaller than the set of features.

11. The IHS of claim 9, wherein in response to the change indicating that the given participant has moved closer to a display, the other set of features is larger than the set of features, and wherein in response to the change indicating that the given participant has moved farther from the display, the other set of features is smaller than the set of features.

12. The IHS of claim 1, wherein the electronic collaboration session uses a plurality of distinct screens visible to the plurality of participants.

13. The IHS of claim 1, wherein the horizontal display device is part of an electronic table.

14. The IHS of claim 1, wherein the first subset of features includes public information public with respect to the plurality of participants and wherein the second subset of features includes private information with respect to the given participant.

15. A method, comprising:
    identifying a first characteristic associated with a given one of a plurality of participants of an electronic collaboration session, at least in part, using an image sensing device;
    identifying a second characteristic associated with the given participant, at least in part, using a proximity sensing device;
    providing the given participant with a user interface for the electronic collaboration session, the user interface having a set of one or more features selected, at least in part, based upon a combination of the first and second characteristics;
    determining, based upon the first and second characteristics, that the given participant is standing in a gap between a horizontal display device and a vertical display device; and
    in response to the determination, splitting the user interface of the given participant into a first portion and a second portion, wherein the first portion is displayed on the horizontal display device with a first subset of the one or more features, wherein the second portion is displayed on the vertical display device with a second subset of the one or more features, and wherein the first and second subsets of the one or more features have different privacy levels.

16. A memory device having program instructions stored thereon that, upon execution by a hardware processor of an Information Handling System (IHS), cause the IHS to:
    identify a first characteristic associated with a given one of a plurality of participants of an electronic collaboration session, at least in part, using an image sensing device;
    identify a second characteristic associated with the given participant, at least in part, using a proximity sensing device;
    provide the given participant with a user interface for the electronic collaboration session, the user interface having a set of one or more features dynamically selected, at least in part, based upon the first and second characteristics;
    determine, based upon the first and second characteristics, that the given participant is standing in a gap between a horizontal display device and a vertical display device; and
    in response to the determination, split the user interface of the given participant into a first portion and a second portion, wherein the first portion is displayed on the horizontal display device with a first subset of the one or more features, wherein the second portion is displayed on the vertical display device with a second subset of the one or more features, and wherein the first and second subsets of the one or more features have different privacy levels.

* * * * *